(12) United States Patent
Boudreau et al.

(10) Patent No.: US 10,042,852 B2
(45) Date of Patent: Aug. 7, 2018

(54) INTERFERENCE AND/OR POWER REDUCTION FOR MULTIPLE RELAY NODES USING COOPERATIVE BEAMFORMING

(71) Applicant: Telefonaktiebolaget LM Ericsson (publ), Stockholm (SE)

(72) Inventors: Gary David Boudreau, Kanata (CA); Ronald Casselman, Metcalfe (CA); Min Dong, Whitby (CA); Ben Liang, Whitby (CA); Ali Ramezani-Kebrya, Toronto (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/506,672

(22) PCT Filed: Sep. 29, 2015

(86) PCT No.: PCT/IB2015/057460
§ 371 (c)(1),
(2) Date: Feb. 24, 2017

(87) PCT Pub. No.: WO2016/051343
PCT Pub. Date: Apr. 7, 2016

(65) Prior Publication Data
US 2017/0277707 A1    Sep. 28, 2017

Related U.S. Application Data

(60) Provisional application No. 62/057,085, filed on Sep. 29, 2014, provisional application No. 62/093,710, filed on Dec. 18, 2014.

(51) Int. Cl.
*H04B 1/00*     (2006.01)
*H04B 15/00*    (2006.01)
(Continued)

(52) U.S. Cl.
CPC ........ *G06F 17/30126* (2013.01); *G06F 3/048* (2013.01); *G06F 3/04817* (2013.01);
(Continued)

(58) Field of Classification Search
CPC ... H04W 52/30; H04W 52/367; H04W 52/24; H04W 52/26; H04B 7/0848–7/0857; H04B 7/24
(Continued)

(56) References Cited

U.S. PATENT DOCUMENTS

| 2007/0111757 A1* | 5/2007 | Cao | H04L 47/14 |
|---|---|---|---|
| | | | 455/561 |
| 2011/0044193 A1* | 2/2011 | Forenza | H04B 7/024 |
| | | | 370/252 |

(Continued)

OTHER PUBLICATIONS

Alihemmati, Ruhallah, et al., "Optimal Power Allocation and Network Beamforming for OFDM-Based Relay Networks," IEEE International Conference on Acoustic, Speech and Signal Processing (ICASSP), May 4-9, 2014, Florence, Italy, IEEE, pp. 6057-6061.
(Continued)

*Primary Examiner* — Simon Nguyen
(74) *Attorney, Agent, or Firm* — Withrow & Terranova, PLLC

(57) ABSTRACT

Systems and methods for interference and/or power reduction for multiple relay pairs using cooperative beamforming are provided. A method of operation of a network node in a cellular communications system includes determining beamforming weights for multiple subchannels for each of multiple relay nodes such that a parameter is minimized. The parameter is a maximum per subchannel interference and/or per relay power usage. Determining the beamforming weights includes determining a dual problem of the minimization of the parameter where a solution maximizing the
(Continued)

dual problem will minimize the parameter; reformulating the dual problem into a semidefinite programming (SDP) problem; and determining if signal-to-noise ratio (SNR) constraints are active. If the SNR constraints are all active, the method includes determining optimal beamforming weights a first way and if the SNR constraints are not all active, determining optimal beamforming weights a second way. In some embodiments, the performance of relays is improved.

20 Claims, 6 Drawing Sheets

(51) Int. Cl.
| | | |
|---|---|---|
| | H04B 17/00 | (2015.01) |
| | G06F 17/30 | (2006.01) |
| | G06F 3/048 | (2013.01) |
| | H04B 7/06 | (2006.01) |
| | G06F 3/0481 | (2013.01) |
| | H04B 7/26 | (2006.01) |

(52) U.S. Cl.
CPC ............. *H04B 7/06* (2013.01); *H04B 7/0619* (2013.01); *H04B 7/26* (2013.01)

(58) Field of Classification Search
USPC ........... 455/69, 63.1, 522, 63.2, 67.11, 67.13
See application file for complete search history.

(56) References Cited

U.S. PATENT DOCUMENTS

| | | | | |
|---|---|---|---|---|
| 2011/0142025 | A1* | 6/2011 | Agee | H04B 7/0413 370/342 |
| 2013/0017855 | A1 | 1/2013 | Hui et al. | |
| 2013/0142128 | A1* | 6/2013 | Yang | H04W 52/0238 370/329 |
| 2014/0094164 | A1* | 4/2014 | Hwang | H04B 7/0634 455/423 |
| 2014/0206367 | A1* | 7/2014 | Agee | H04W 28/0236 455/450 |
| 2014/0293904 | A1* | 10/2014 | Dai | H04B 7/024 370/329 |
| 2015/0146646 | A1* | 5/2015 | Chen | H04W 52/346 370/329 |
| 2016/0119941 | A1* | 4/2016 | Ko | H04W 52/04 455/453 |

OTHER PUBLICATIONS

Alizadeh, Ardalan, et al., "Optimal Beamforming in Two-Way Relay Networks with Cognitive Radio Capabilities," IEICE Transactions on Communications, vol. E94-B, Issue 11, Nov. 2011, The Institute of Electronics, Information and Communication Engineers, pp. 3089-3097.

Dong, Min, et al., "Optimal Multi-antenna Relay Beamforming with Per-Antenna Power Control," IEEE International Conference on Communications (ICC), Jun. 10-15, 2012, Ottawa, Canada, IEEE, pp. 2192-2196.

Dong, Min, et al., "Unicast Multi-Antenna Relay Beamforming With Per-Antenna Power Control: Optimization and Duality," IEEE Transactions on Signal Processing, vol. 61, Issue 23, Dec. 1, 2013, IEEE, pp. 6076-6090.

Kha, Ha H. et al., "Joint Optimization of Source Power Allocation and Cooperative Beamforming for SC-FDMA Multi-User Multi-Relay Networks," IEEE Transactions on Communications, vol. 61, Issue 6, Jun. 2013, IEEE, pp. 2248-2259.

Kha, Ha Hoang et al., "Optimization of Cooperative Beamforming for SC-FDMA Multi-User Multi-Relay Networks by Tractable D.C. Programming," IEEE Transactions on Signal Processing, vol. 61, Issue 2, Jan. 15, 2013, IEEE, pp. 467-479.

Nguyen, Duy H. N. et al., "Distributed Beamforming in Relay-Assisted Multiuser Communications," IEEE International Conference on Communications (ICC), Jun. 14-18, 2009, Dresden, Germany, IEEE, 5 pages.

Nguyen, D.H.N., et al., "Power allocation in wireless multiuser multi-relay networks with distributed beamforming," IET Communications, vol. 5, Issue 14, Sep. 23, 2011, IET, pp. 2040-2051.

Ramezani-Kebrya, Ali, et al., "Optimal Cooperative Relay Beamforming for Interference Minimization," Wireless Communications Symposium, Proceedings of IEEE International Conference on Communications (ICC), Jun. 11, 2015, London, United Kingdom, IEEE, pp. 2500-2505.

Wang, Da et al., "Coordinated Relay Beamforming Based on the Worst-case SINR in Multicell Wireless Systems," Signal Processing for Communications Symposium (GLOBECOM 2012), Dec. 3-7, 2012, IEEE, pp. 3941-3945.

Xiao, Qiang, et al., "On Performance of Multi-antenna Relay Beamforming with Per-Antenna Power Constraints," Conference Record of the Forty Sixth Asilomar Conference on Signals, Systems and Computers (ASILOMAR 2012), Nov. 4-7, 2012, Pacific Grove, California, IEEE, pp. 1371-1375.

Yu, Wei et al., "Transmitter Optimization for the Multi-Antenna Downlink With Per-Antenna Power Constraints," IEEE Transactions on Signal Processing, vol. 55, Issue 6, Jun. 2007, IEEE, pp. 2646-2660.

Zhang, Xiaoning et al., "Collaborative Relay Beamforming Based on Minimum Power for M2M Devices in Multicell Systems," International Journal of Distributed Sensor Networks, vol. 2013, Article ID 293565, Nov. 21, 2013, Hindawi Publishing Corporation, 10 pages.

International Search Report and Written Opinion for PCT/IB2015/057460, dated Nov. 24, 2015, 15 pages.

\* cited by examiner

INTERFERENCE AND/OR POWER REDUCTION FOR MULTIPLE RELAY NODES USING COOPERATIVE BEAMFORMING

RELATED APPLICATIONS

This application is a 35 U.S.C. § 371 national phase filing of International Application No. PCT/IB2015/057460, filed Sep. 29, 2015, which claims the benefit of U.S. Provisional Application Nos. 62/093,710, filed Dec. 18, 2014 and 62/057,085, filed Sep. 29, 2014, the disclosures of which are incorporated herein by reference in their entireties.

FIELD OF THE DISCLOSURE

The present disclosure relates to beamforming weights used by nodes in a wireless communication network, and in particular to methods and systems for determining beamforming weights for a relay node in a wireless communication network.

BACKGROUND

The constantly increasing demand for high data rates in cellular networks requires new approaches to meet this expectation. A challenging question for operators is how to evolve their existing cellular networks so as to meet the requirement for higher data rates. In this respect, a number of approaches are possible: i) increase the density of their existing macro base stations, ii) increase the cooperation between macro base stations, iii) deploy smaller base stations or relay nodes (RNs) in areas where high data rates are needed within a macro base stations grid, iv) employ pico or small cell overlay technology within buildings, or v) employ device-to-device communications to offload traffic from the cellular macro.

Building a denser macro base station grid, while simultaneously enhancing the cooperation between macro base stations (hence either using options i) or ii) above) is definitely a solution that meets the requirement for higher data rates; however such an approach is not necessarily a cost-efficient option, due to the costs and delays associated with the installation of macro base stations, especially in urban areas where these costs are significant.

Deploying relay nodes as required in a network to grow its capacity and coverage can be advantageous from a perspective of ease and flexibility of deployment, however the robustness of the coverage and capacity provided by overlay relay nodes in a macro network, is not always guaranteed due to possible interference from relay nodes in adjacent cells to the cell of the desired signal transmissions.

One of the main objectives of low power nodes is to absorb as many users as possible from a macro layer in order to offload the macro layer and allow for higher data rates in both the macro and in a pico layer. In this respect, several techniques have been discussed and proposed within 3GPP:
  (1) Extending the range of small cells or relays (i.e. low power nodes or LPNs) by using cell specific cell selection offsets.
  (2) Increasing the transmission power of Low Power Nodes (LPNs) simultaneously by setting appropriately the UL power control target P0 for the users connected to low power nodes.
  (3) Employing beamforming at LPNs acting as relays for communication between the serving macro base stations as well as between receiver mobile devices or user equipment (UE).

Thus the solution of deploying LPNs acting as relays within the already existing macro layer grid is an appealing option because since these LPNs are anticipated to be more cost-efficient than macro base stations, their deployment time and cost will be less. In such scenarios, use of relay nodes that employ in-band backhaul may provide a viable option that provides pico cell type coverage either indoors or outdoors and mitigates the cost and effort of deploying land-line backhaul to all the pico base stations.

As noted above, there exists the potential for relay based communications to cause interference to both the transmissions in the serving cell of desired signals as well as to adjacent cells in the network.

Deployment of relay nodes that do not cause interference can, in many instances, require careful deployment of the location and orientation of the antenna of relay nodes which can impact the ease and cost of deployment. This may require additional time and labor which is undesirable. As such, systems and methods for interference and/or power reduction for relay nodes are needed.

SUMMARY

Systems and methods for interference and/or power reduction for multiple relay nodes using cooperative beamforming are provided. In some embodiments, a method of operation of a network node in a cellular communications system includes determining beamforming weights for multiple subchannels for each of multiple relay nodes such that a parameter is minimized. In some embodiments, this minimization is for a defined channel quality. In some embodiments, this channel quality may be Signal-to-Noise Ratio (SNR), Signal-to-Interference-plus-Noise Ratio (SINR), or any other metric bounding the quality of the desired signal. The parameter is a maximum per subchannel interference and/or a maximum per relay power usage. Determining the beamforming weights includes determining a dual problem of the minimization of the parameter where a solution maximizing the dual problem will minimize the parameter; reformulating the dual problem into a semidefinite programming (SDP) problem; and determining if signal-to-noise ratio (SNR) constraints are all active. If the SNR constraints are all active, the method includes solving the SDP problem and determining the beamforming weights for each of the relay nodes a first way such that the parameter is minimized. If the SNR constraints are not all active, the method includes solving the SDP problem and determining the beamforming weights for each of the plurality of relay nodes a second way such that the parameter is minimized. According to some embodiments, the performance of relay nodes in a wireless communication system (e.g. a wireless cellular network) is improved.

Advantageously, some embodiments of the present disclosure reduce the maximum per-sub-channel interference between relay nodes and the per-relay power is consumed in an efficient way, particularly as the number of relay nodes becomes large.

The present disclosure comprises embodiments which are applicable to any type of node in a network that can be configured to determine beamforming weights for a relay node. This may include, for example, network nodes, relay nodes, or wireless devices, such as User Equipment (UEs). In one example, a beamforming controller in or associated with a cell receives channel information (e.g. Channel State Information (CSI)) from network nodes in the cell at the receiving end of a radio link (e.g. relay nodes and/or UEs) and possibly channel information from other beamforming controllers in neighboring cells. Based on the channel information received, the beamforming controller determines beamforming weights for use in relay nodes in accordance with the principles described herein.

In some embodiments, the method also includes communicating the determined beamforming weights to each of the relay nodes.

In some embodiments, solving the SDP problem the second way includes solving the SDP problem and determining the beamforming weights for each of the relay nodes using an iterative method such that the parameter is minimized. In some embodiments, solving the SDP problem using the iterative method includes choosing a proper subset of the subchannels; determining beamforming weights for the proper subset of the subchannels such that the parameter is minimized; and reformulating the SDP problem to remove effects of the proper subset of the plurality of subchannels. If solving the reformulated SDP problem is sufficient to obtain the beamforming weights for the subchannels other than the proper subset of the subchannels, the method includes solving the reformulated SDP problem to obtain the beamforming weights for the subchannels other than the proper subset of the subchannels. If solving the reformulated SDP problem is insufficient to obtain the beamforming weights for the subchannels other than the proper subset of the subchannels, the method includes choosing a second proper subset of the subchannels from the subchannels other than the first proper subset; determining beamforming weights for the second proper subset of the subchannels such that the parameter is minimized; and reformulating the SDP problem to remove effects of the second proper subset of the plurality of subchannels. If solving the reformulated SDP problem is sufficient to obtain the beamforming weights for the subchannels other than the second proper subset of the subchannels, the method includes solving the reformulated SDP problem to obtain the beamforming weights for the subchannels other than the second proper subset of the plurality of subchannels.

In some embodiments, the method also includes repeating the steps of choosing, determining, reformulating, and solving if the reformulated SDP problem cannot be solved to obtain the beamforming weights for the subchannels other than the proper subset of the subchannels, until the beamforming weights for all of the subchannels are determined.

In some embodiments, solving the SDP problem the first way includes solving the SDP problem and determining the optimal beamforming weights formulaically. In some embodiments, prior to reformulating the dual problem into the SDP problem, the method includes checking a necessary feasibility condition. In some embodiments, the network node is a base station in communication with each of the relay nodes.

In some embodiments, a network node in a cellular communications network includes a processing module and a memory module. The memory module stores instructions executable by the processing module whereby the network node is operable to perform any of the methods discussed above.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
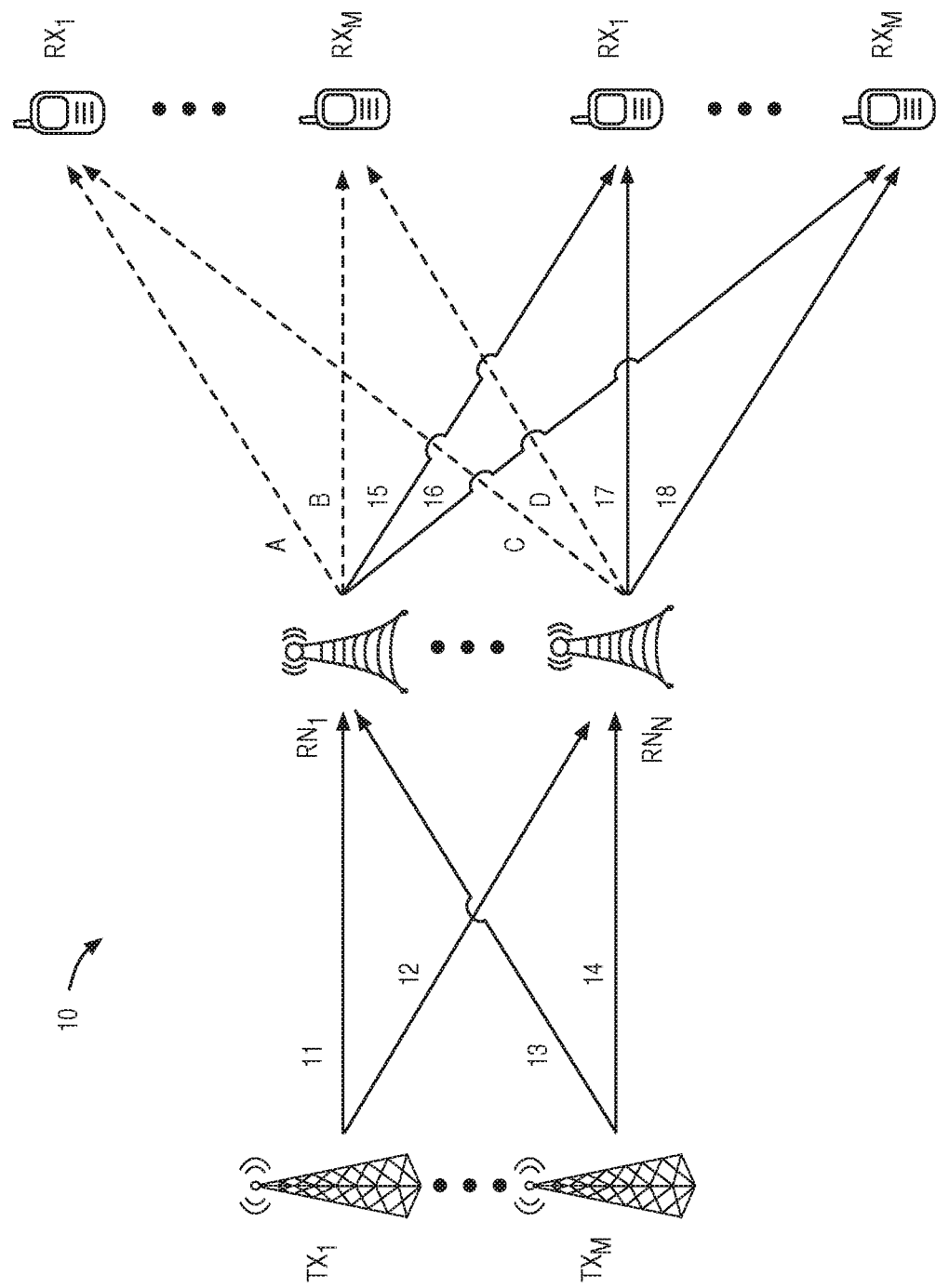
FIG. 1 illustrates one example of a wireless communication network in which multiple relay nodes are used to relay communications between a plurality of transmitters and a plurality of receivers in accordance with the principles described herein.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The present disclosure includes embodiments which can be implemented in any network node and/or a wireless device (e.g. a user equipment (UE)) configured as a relay node (e.g. capable of relaying/forwarding signals from a source node to a destination node). The network node herein can be a serving network node of the UE or any network node with which the UE can establish or maintain a communication/session link and/or receive information (e.g. via a broadcast channel).

The embodiments use a generic term 'network node' that may be any kind of network node. Examples include eNode Bs, Node Bs, Base Stations, wireless Access Points (AP), base station controllers, radio network controllers, relays, donor node controlling relays, Base Transceiver Stations (BTS), transmission points, transmission nodes, source nodes, destination nodes, Remote Radio Head (RRH) devices, Remote Radio Unit (RRU) devices, nodes in Distributed Antenna System (DAS), Core Network (CN) node, Mobility Management Entity (MME), etc.

The embodiments also use a generic term 'UE'. However a UE can be any type of wireless device, which is capable of at least communicating with a wireless network. Examples of such UEs are smart phones, Machine Type Communications (MTC) devices, Machine-to-Machine (M2M) devices, Personal Digital Assistants (PDAs), tablet computers (e.g. iPAD), sensors, modems, Laptop Embedded Equipped (LEE) devices, Laptop Mounted Equipment (LME), Universal Serial Bus (USB) dongles etc.

The embodiments also use a generic term 'relay". However, a relay can be any type of network node or wireless device, which is capable of at least receiving wireless communication from one or more source network nodes and retransmitting through wireless communication to one or more destination network nodes. Examples of relay nodes include network nodes, RRH/RRU devices, and Device-To-Device (D2D) capable UEs.

Although terminology from 3GPP LTE (or Evolved Universal Terrestrial Access Network (E-UTRAN)) has been used in example embodiments, the present disclosure is not limited to such systems and could apply to other wireless systems, including, for example, Wideband Code Division Multiple Access (WCDMA), UTRA (Universal Mobile Telecommunications System Terrestrial Radio Access Network) Frequency-Division Duplexing (FDD), UTRA Time-Division Duplexing (TDD), and Global System for Mobile Communications (GSM)/GSM Enhanced Data rates for GSM Evolution (EDGE) Radio Access Network (GERAN)/EDGE.

The relay node examples described herein are configured to be served by or operate with a Single Carrier (SC), either at a UE (i.e. single carrier operation of the UE) or in a network node. However, the present disclosure is equally applicable to multi-carrier or carrier aggregation based communication. In some embodiments, this is accomplished by viewing the aggregate of all subchannels as a single carrier.

Referring now to FIG. 1, there is shown a wireless communication network 10 in which a plurality of source network nodes $TX_1, \ldots TX_M$ communicate wirelessly with a plurality of destination nodes $RX_1, \ldots RX_M$ (e.g. UEs) via a plurality of relay nodes $RN_1, \ldots RN_N$. For the purpose of this example and description therein, it is assumed that all network nodes shown (source/relay/destination nodes) have a single antenna. However, the principles described herein can also apply to scenarios in which each network node is comprised of more than one antenna. Furthermore it is assumed that each source-destination pair operates in a specific frequency band and/or time resources (e.g. a specific set of Resource Blocks (RBs)) such that the communication channels corresponding to different pairs are orthogonal. In the example shown in FIG. 1, the source nodes $TX_1, \ldots TX_M$ are assumed to be operating within one network node (e.g. an eNodeB) in a single cell (the cell of interest) where each source-destination pair uses a different set of RBs. Other implementations are possible. It is also assumed that each relay node $RN_1, \ldots RN_N$ can be assigned to multiple source-destination pairs such that the available per-relay power is shared among all pairs and that the total power available at the relays, $P_r$, can be allocated across different sub-channels.

In this example, each source network node $TX_1, \ldots TX_M$ transmits its signal to its corresponding destination node $RX_1, RX_M$ using the relay nodes $RN_1, \ldots RN_N$. Each relay node transmits the amplified received signal (or some other version) to one or more destinations nodes $RX_1, \ldots RX_M$. The source nodes $TX_1, \ldots TX_M$ each communicate via a source-relay subchannel with one or more of the relay nodes $RN_1, \ldots RN_N$. In the specific example of FIG. 1, source node $TX_1$ communicates via subchannels 11, 12 with relay nodes $RN_1$ and $RN_N$ while source node $TX_M$ communicates via source-relay subchannels 13 and 14 with relay nodes $RN_1$ and $RN_N$. Similarly, the relay nodes $RN_1, \ldots RN_N$ communicate with the destination nodes $RX_1, \ldots RX_M$ via one or more relay-destination subchannels. Relay node $RN_1$ communicates via subchannels 15, 16 with destination node $RX_1$ and $RX_M$ while relay node $RN_N$ communicates via subchannels 17 and 18 with destination nodes $RX_1$ and $RX_M$. In FIG. 1, the source-relay and relay-destination subchannels corresponding to source-destination pairs are shown as solid lines, while the interference caused by the relay nodes $RN_1, \ldots RN_N$ at destination nodes $RX_M, \ldots RX_M$ of another (neighboring) cell is represented as dotted lines (as subchannels A, B, C, and D). Such interference is in part a result of the reuse by source-destination pairs in the neighboring cell of the same frequency band and/or time resources (e.g. same RBs) as that used by the source-destination pairs in the cell of interest.

In the example of FIG. 1, the channel between a given source-destination node pair is the sum of all of the source-relay subchannels from the source node $TX_1, \ldots TX_M$ of that pair to one or more relay nodes $RN_1, \ldots RN_N$ and all of the sub-channels from the one or more relay nodes $RN_1, \ldots RN_N$ to the destination node $RX_M, \ldots RX_M$ of that pair.

Figure 2:
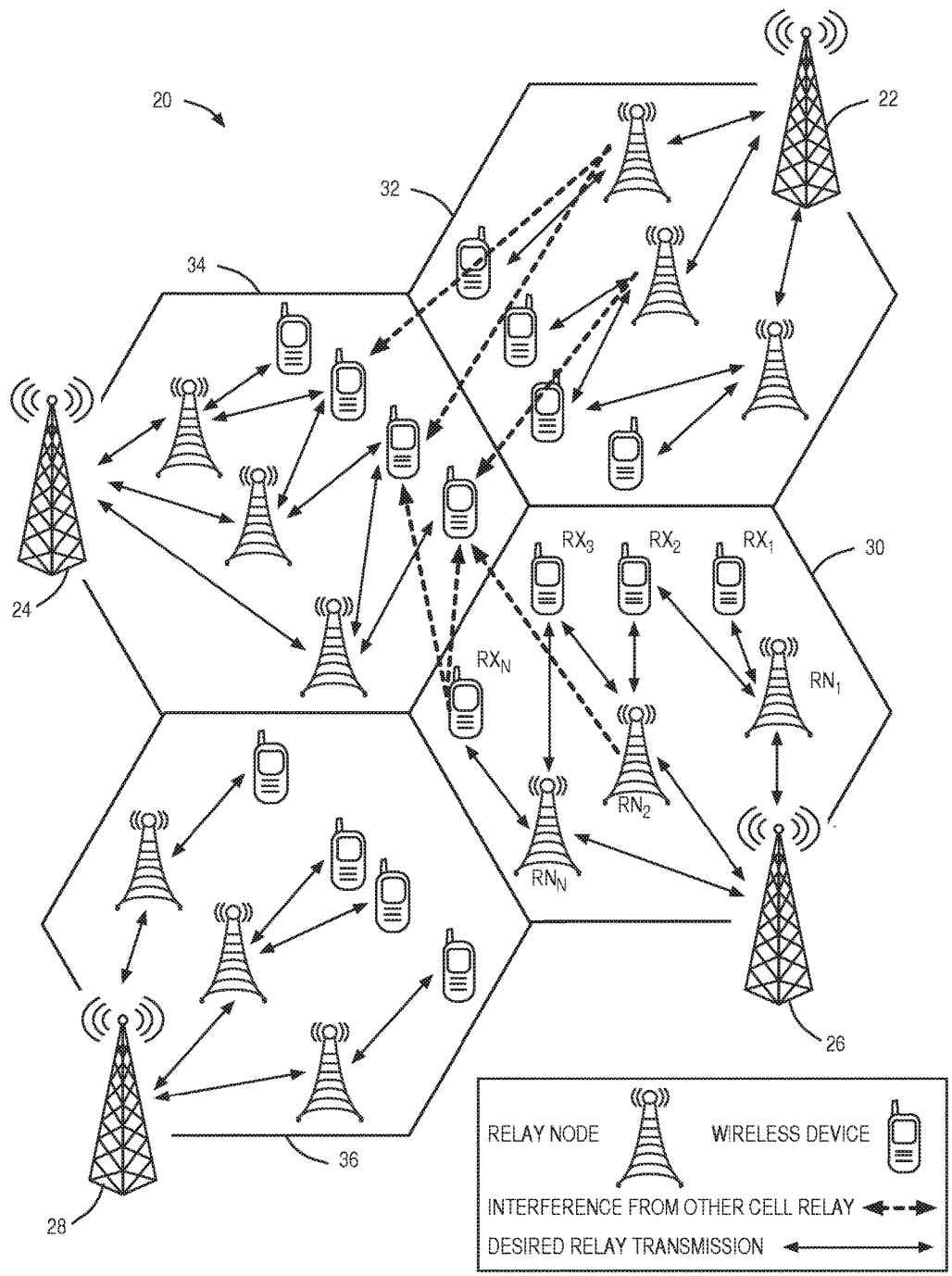
FIG. 2 illustrates another example of a wireless communication network in which relay nodes are used to relay communications between a plurality of network nodes and a plurality of wireless devices in accordance with the principles described herein.

Referring now to FIG. 2, there is shown another example of a wireless communication network 20 with a plurality of network nodes 22, 24, 26, 28. Each network node 22, 24, 26, and 28 in this example each includes a plurality of source network nodes $TX_1, \ldots TX_M$ configured to communicate wirelessly with a plurality of destination nodes $RX_1, \ldots RX_M$ (e.g. UEs) via a plurality of relay nodes $RN_1, \ldots RN_N$. As used herein, a source network node is the source of a transmission and may be a base station or a separate transmitter of a base station, or perhaps an RRH, among other possibilities. A relay node receives transmissions and relays them by transmitting them again. A destination node is the intended destination for a transmission. For clarity, only the sources nodes $TX_1, \ldots TX_M$ of network node 26, relay nodes $RN_1, \ldots RN_N$ and destination nodes $RX_1, \ldots RX_M$ (UEs) of cell 308 are labelled as such and hereinafter described. As with the example of FIG. 1, it is assumed that all network nodes shown (source/relay/destination) have a single antenna, but the principles described herein can also apply multiple antenna nodes. Furthermore it is assumed that each source-destination pair operates in a specific frequency band and/or time resources (e.g. a specific set of RRBs) such that the communication channels corresponding to different pairs are orthogonal. In the example shown in FIG. 2, the source nodes $TX_1, \ldots TX_M$ are assumed to be operating within one network node 26 (e.g. an eNodeB) in a single cell 30 (the cell of interest) where each source-destination pair uses a different set of RBs. Other implementations are possible. It is also assumed that each relay node $RN_1, \ldots RN_N$ can be assigned to multiple source-destination pairs such that the available per-relay power is shared among all pairs and that the total power available at the relays, $P_r$, can be allocated across different subchannels.

In the example of FIG. 2, each source network node $TX_1, \ldots TX_M$ transmits its signal to its corresponding destination node $RX_1, RX_M$ using the relay nodes $RN_1, \ldots RN_N$. Each relay node transmits the amplified received signal (or some other version) to one or more destinations nodes $RX_1, \ldots RX_M$. The source nodes $TX_1, \ldots TX_M$ each communicate via a source-relay subchannel with one or more of the relay nodes $RN_1, \ldots RN_N$. The relay nodes $RN_1, \ldots RN_N$ each communicate with the destination nodes $RX_1, \ldots RX_M$ via a relay-destination subchannel. In FIG. 2, the source-relay and relay-destination subchannels corresponding to source-destination pairs are shown as solid lines while the interference caused by the relay nodes $RN_1, \ldots$ $RN_N$ at destination nodes $RX_1, \ldots RX_M$ of other (neighboring) cells (e.g. cells 32, 34, 36) is represented as dotted lines. Such interference is in part a result of the reuse by source-destination pairs in the neighboring cells of the same frequency band and/or time resources (e.g. same RBs) as that used by the source-destination pairs in cell 30 (the cell of interest). The channel between a given source-destination node pair is the sum of all of the source-relay sub-channels from the source node $TX_1, \ldots TX_M$ of that pair to one or more relay nodes $RN_1, \ldots RN_N$ and all of the sub-channels from the one or more relay nodes $RN_1, \ldots RN_N$ to the destination node $RX_1, \ldots RX_M$ of that pair.

According to an example embodiment of the present disclosure, a beamforming controller in or associated with a cell of interest operates to determine beamforming weights for the relay nodes $RN_1, \ldots RN_N$ of that cell such that for a given SNR (which is subject to a certain Quality of Service(QoS)), the weights determined reduce (e.g. minimize) the maximum per sub-channel interference at destination nodes in neighboring cells and/or the maximum per-relay power usage. As explained below in further detail, in some examples, the beamforming controller operates to receive channel information (e.g. Channel State Information (CSI)) from network nodes in the cell at the receiving end of a radio link (e.g. relay nodes and/or UEs) and possibly channel information from other beamforming controllers in neighboring cells. Based on the channel information received, the beamforming controller determines beamforming weights for use in the relay nodes $RN_1, \ldots RN_N$ in accordance with the principles described herein.

Although a centralized beamforming controller is described, it is understood that the beamforming processing functionality described herein for the relay nodes $RN_1, \ldots RN_N$ could be distributed across one or more network nodes. For example, the present disclosure can also be applied to an arrangement where each relay node $RN_1, \ldots RN_N$ obtains the CSI information described therein and determines its own beamforming weights. For clarity and brevity, the following description is directed to a centralized beamforming controller.

The following description provides a basis and context for minimizing the maximum per subchannel interference. Some methods for achieving this are also discussed.

The received signal at the m-th subchannel of the i-th relay node $RN_1, \ldots RM_N$ is given by:

$$y_{m,i} = \sqrt{P_0} h_{m,i} s_m + n_{r,m,i}, \quad (1)$$

where $s_m$ is the transmitted symbol with transmission power $P_0$ and $n_{r,m,i}$ denotes Additive White Gaussian Noise (AWGN). Assuming $E[|s_m|^2]=1$, $E[s_m s^*_n]=0$, $E[n_{r,m,i} n^*_{r,n,j}]=0$, $E[|n_{r,m,i}|^2]=\sigma_r^2$ for m=1, $\Lambda$, M, i=1, $\Lambda$, N, n≠m, j≠i, the vector of received signals at the m-th subchannel of all the relay nodes $RN_1, \ldots RN_N$ is given by:

$$z_m = \sqrt{P_0} h_m s_m + n_{r,m}, \quad (2)$$

where $h_m \triangleq [h_{m,1}, \Lambda, h_{m,N}]^T$, in which $h_{m,i}$ denotes the subchannel from the $m^{th}$ transmitter to the $i^{th}$ relay node and $n_{r,m} \triangleq [n_{r,m,1}, \Lambda, n_{r,m,N}]^T$. Each relay node $RN_1, \ldots RN_N$ multiplies the received signal at different subchannels by a complex coefficient, $w_{m,i}$, and transmits the result in the corresponding channel. Let $g_m \triangleq [g_{m,1}, \Lambda, g_{m,N}]^T$, where $g_{m,i}$ denotes the channel from the i-th relay to the m-th destination. The received signal at the m-th destination node $RX_1, \ldots RX_M$ is given by:

$$r_m = g_m^T W_m z_m + n_m \quad (3)$$

$$= \sqrt{P_0} g_m^T W_m h_m s_m + g_m^T W_m n_{r,m} + n_m, \quad (4)$$

where, $W_m \triangleq \text{diag}(w_{m,1}, \Lambda, w_{m,N})$, and $n_m$ denotes AWGN at the m-th destination node $RX_1, RX_M$. The per-antenna power constraint at the i-th relay node $RN_1, \ldots RN_N$ is expressed as $$\sum_{m=1}^{M} |w_{m,i}|^2 [R_{y,m}]_{i,i} \leq P_r, \quad (5)$$

for m=1, $\Lambda$, M, where $R_{y,m} \triangleq P_0 h_m h_m^H + \sigma_r^2 I$. The signal power at the m-th destination node $RX_1, \ldots RX_m$ is given by:

$$P_{S,m} = P_0 [g_m^T W_m h_m h_m^H W_m^H g_m^*] \quad (6)$$

$$= P_0 w_m^H F_m w_m,$$

where $w_m \triangleq \text{diag}(W_m)$ and $F_m \triangleq f^*_m f_m^T$, where $f_m = g_m \odot h_m \triangleq [h_{m,1} g_{m,1}, \ldots, h_{m,N} g_{m,N}]^T$. Noise power at the m-th destination node $RX_1, \ldots RX_m$ is obtained as per the following equation:

$$P_{S,m} = E[n_{r,m}^H W_m^H g_m^* g_m^T W_m n_{r,m}] + \sigma_d^2 \quad (7)$$

$$= w_m^H G_m w_m + \sigma_d^2,$$

where $G_m \triangleq \sigma_r^2 \text{diag}(g^*_m g_m^T)$. Hence, the SNR at the m-th destination node $RX_1, \ldots RX_M$ is given by:

$$SNR_m = \frac{P_0 w_m^H F_m w_m}{w_m^H G_m w_m + \sigma_d^2}. \quad (8)$$

Consider a neighboring cell (such as cells 32, 34, 36 of FIG. 2) which is placed near the desired cell (such as cell 30 of FIG. 2). At each destination node $RX_1, \ldots RX_m$ of the neighboring cell, the interference from the relay nodes (such as relay nodes $RN_1, \ldots RN_N$ of cell 30 of FIG. 2) of the desired cell transmitting in the same subchannel is received. Let $\tilde{g}_m$ denote the second hop m-th interference subchannel from the desired cell to the neighboring one, i.e., the vector of channels from the N relays of the desired cell to the m-th receiver in the neighboring cell. The received signals at the m-th destination node of the neighboring cell is as follows:

$$\tilde{r}_m = \tilde{g}_m^T W_m z_m + \tilde{n}_m, \quad (9)$$

where $W_m$ is defined as in (1). Let $I_m$ denote the interference power of at the m-th subchannel of the neighboring cell. Substituting the received signals at the destination node results in:

$$I_m = P_0 w_m^H \tilde{F}_m w_m + w_m^H \tilde{G}_m w_m, \quad (10)$$

where $\tilde{F}_m \triangleq \tilde{f}^*_m \tilde{f}_m^T$, $\tilde{f}_m \triangleq \tilde{g}_m \odot h_m$, and $\tilde{G}_m \triangleq \sigma_r^2 \text{diag}(\tilde{g}^*_m \tilde{g}_m^T)$.

The following parameters are employed in the method to reduce (i.e. minimize) the maximum per-subchannel interference. In some embodiments, this minimization is for a defined channel quality. In some embodiments, this channel quality may be Signal-to-Noise Ratio (SNR), Signal-to-Interference-plus-Noise Ratio (SINR), or any other metric bounding the quality of the desired signal:

$h_m$: the channel response vector from the $m^{th}$ transmitter $TX_1, \ldots TX_m$ to all of the relay nodes $RN_1, \ldots RN_N$.

$g_m$: the $m^{th}$ sub-channel response vector from the relay nodes $RN_1, \ldots RN_N$ to the $m^{th}$ destination node $RX_1, \ldots RX_m$.

$\tilde{g}_m$: the $m^{th}$ interference sub-channel response vector from the relay nodes $RN_1, \ldots RN_N$ to the destination nodes of the neighboring cell.

$f_m$: element-wise vector multiplication of $g_m$ and $h_m$ $\tilde{f}_m$: element-wise vector multiplication of $\tilde{g}_m$ and $h_m$ $\gamma_m$: SNR of the mth subchannel $P_0$: the transmit power $F_m \triangleq f^*_m f_m^T$, $\tilde{F}_m \triangleq \tilde{f}^*_m \tilde{f}_m^T$, $G_m \triangleq \sigma_r^2 \text{diag}(g^*_m g_m^T)$.

$\tilde{G}_m \triangleq \sigma_r^2 \text{diag}(\tilde{g}^*_m \tilde{g}_m^T)$.

$\tilde{B}_m \triangleq P_0 \tilde{F}_m + \tilde{G}_m$ $E[|n_{r,m,i}|^2] = \sigma_r^2$ In the example shown in FIGS. 1 and 2, CSI measurements are obtained by a centralized beamforming controller (i.e., the desired system/cell has information of $\{f_m, g_m, \tilde{g}_m\}_{m=1}^M$. Using this interference CSI, the beamforming controller can determine optimized beamforming weights for the the relay nodes $RN_1, \ldots RN_N$ of the desired system such that the maximum generated interference at the destination of neighboring cells is reduced or, in some cases, minimized. Note that the interference CSI is denoted by tilde.

In the case of a centralized beamforming scenario, it is assumed that a beamforming controller is present in each cell, and may be co-located with a network node (i.e. the base station). The functions of the beamforming controller may include the following:

(1) to collect the CSI of each radio link within its own cell, from the node at the receiving end of the link;

(2) to collect the CSI of each radio link from interfering relays in neighbouring cells to destination mobile nodes in its own cell, and to send such CSI to the beamforming controller of each neighboring cell containing interfering relays;

(3) to collect interference CSI from beamforming controllers in neighbouring cells;

(4) to compute the optimal beamweights, (5) to send the beamweights to the relays.

Each network node at the transmitting end of a radio link sends pilot or reference symbols periodically or on-demand. Each network node at the receiving end of a radio link measures the CSI of this link by observing the pilot symbols sent by the network node at the transmitting end. The receiving network node sends its CSI measurements or a quantized version of the CSI measurements to the beamforming controller in its own cell via a separate control channel.

Let $R_m \triangleq \text{diag}([R_{y,m}]_{1,1}, \Lambda, [R_{y,m}]_{N,N})$ and $D_i$ denote the N×N diagonal matrix with 1 in the i-th diagonal and zero otherwise. The problem of minimizing the maximum per-subchannel interference power subject to per relay power constraint and minimum QoS guarantee, in terms of received SNR, is given by:

$$\min_{w_1,\ldots,w_M,\tilde{\theta}} \tilde{\theta} \quad (11)$$

$$\text{subject to } w_m^H \tilde{B}_m w_m \leq \tilde{\theta}, m = 1, \ldots, M, \quad (12)$$

$$\sum_{m=1}^{M} w_m^H R_m D_i w_m \leq P_r, i = 1, \ldots, N, \quad (13)$$

$$\frac{P_0 w_m^H F_m w_m}{w_m^H G_m w_m + \sigma^2} \geq \gamma_m, m = 1, \ldots, M, \quad (14)$$

where $\tilde{B}_m \triangleq P_0 \tilde{F}_m + \tilde{G}_m$ for m=1, $\Lambda$, M . . . .

The upper-bound of $SNR_m$ in (8) is obtained by finding the asymptotic $SNR_m$ as $\sigma^2 \to 0$ in the denominator and solving the generalized eigenvalue problem i.e., $$SNR_{UP,m} = P_0 f_m^H G_m^\dagger f_m. \quad (17)$$

A necessary condition for feasibility of equation (11) is as follows:

$$P_0 f_m^H G_m^\dagger f_m / \gamma_m \geq 1, \text{ for } m=1, \Lambda, M. \quad (18)$$

An SDP Based Solution for optimum dual variables can be found by denoting $a \triangleq [-\sigma^2 1_{M\times 1}^T, P_r 1_{N\times 1}^T, 0_{M\times 1}^T]^T$ and $b \triangleq [0_{(M+N)\times 1}^T, 1_{M\times 1}^T]^T$. The dual problem is given by:

$$\min_{\tilde{x}} \tilde{a}^T \tilde{x} \quad (19)$$

$$\text{subject to } \sum_{i=1}^{2M+N} \tilde{x}_i \Psi_{m,i} \leq 0, m = 1, \ldots, M, \quad (20)$$

$$\tilde{x} \geq 0, \tilde{b}^T \tilde{x} \leq 1, \quad (21)$$

where $$\Psi_{m,n} = \frac{P_0}{\gamma_m} f_m f_m^H - G_m, \Psi_{m,M+j} = -R_m D_j \text{ for } j = 1, \Lambda, N,$$

$$\Psi_{m,M+N+m} = -B_m$$

for m=1, $\Lambda$, M, and all other $\Psi$ are zeros.

In the following, the details of the above steps are explained. The $SNR_m$ can be recast as $$\frac{P_0 |w_m^H f_m|^2}{\|G_m^{\frac{1}{2}} \Pi\|^2 + \sigma^2},$$

and the optimization problem (11) is given by:

$$\min_{w_1,\ldots,w_M,\tilde{\theta}} \tilde{\theta} \quad (22)$$

$$\frac{P_0 |w_m^H f_m|^2}{\left\|G_m^{\frac{1}{2}} w_m\right\|^2 + \sigma^2} \geq \gamma_m, m = 1, \ldots, M, \quad (23)$$

(12), and (13)                 (12) (13)

The SNR constraints can be rewritten at the relays (23) in a conic form, i.e., $$\sqrt{P_0}\, w_m^H f_m \geq \sqrt{\gamma_m} \left\| \begin{array}{c} G_m^{1/2} w_m \\ \sigma \end{array} \right\|. \quad (24)$$

Then the optimization problem (22) can be recast as:

$$\min_{w_1,\ldots,w_M,\tilde{\theta}} \tilde{\theta} \quad (25)$$

$$\sqrt{P_0}\, w_m^H f_m \geq \sqrt{\gamma_m} \left\| \begin{array}{c} G_m^{1/2} w_m \\ \sigma \end{array} \right\|, m=1,\ldots,M, \quad (26)$$

(12), and (13)

which is a second order cone programming (SOCP). SOCP is convex, and there is zero duality gap between SOCP and its dual. It can be shown that there is zero duality gap between the original nonconvex problem (11) and its dual. The dual problem associated with (11) is as follows:

$$\max_{\tilde{\lambda},\tilde{\mu},\tilde{\alpha}} \min_{w_m,\tilde{\theta}} L(\{w_m\}, \tilde{\theta}, \tilde{\lambda}, \tilde{\mu}, \tilde{\alpha}) \quad (27)$$

subject to $\tilde{\lambda} \geq 0, \tilde{\mu} \geq 0, \tilde{\alpha} \geq 0,$ (28)
where $$L(\{w_m\}, \tilde{\theta}, \tilde{\lambda}, \tilde{\mu}, \tilde{\alpha}) = \tilde{\theta} + \sum_{i=1}^{N} \tilde{\lambda}_i \left( \sum_{m=1}^{M} w_m^H R_m D_i w_m - P_r \right) +$$

$$\sum_{m=1}^{M} \tilde{\mu}_m (w_m^H \tilde{B}_m w_m - \tilde{\theta}) + \sum_{m=1}^{M} \tilde{\alpha}_m \left( \sigma^2 + w_m^H G_m w_m - \frac{P_0}{\gamma_m} |w_m^H f_m|^2 \right). \quad (29)$$

The Lagrangian (29) can be recast as:

$$L = \sum_{m=1}^{M} \tilde{\alpha}_m \sigma^2 + \tilde{\theta}\left(1 - \sum_{m=1}^{M} \tilde{\mu}_m\right) - P_r\left(\sum_{i=1}^{N} \tilde{\lambda}_i\right) + \sum_{m=1}^{M} w_m^H \left(\tilde{K}_m - \frac{\tilde{\alpha}_m P_0}{\gamma_m} f_m f_m^H\right) w_m, \quad (30)$$

where $D_{\tilde{\lambda}} \triangleq \mathrm{diag}(\tilde{\lambda}_1, \Lambda, \tilde{\lambda}_N)$ and:

$$\tilde{K}_m \triangleq R_m D_{\tilde{\lambda}} + \tilde{\mu}_m \tilde{B}_m + \tilde{\alpha}_m G_m. \quad (31)$$

The aim is to find the optimum objective of (11) through the dual problem (27). It is not difficult to verify the following constraints in order to avoid $L_2=-\infty$ as the optimum value of inner minimization of (27).

$$\tilde{K}_m \succeq \frac{\tilde{\alpha}_m P_0}{\gamma_m} f_m f_m^H \quad (32)$$

$$\sum_{m=1}^{M} \tilde{\mu}_m \leq 1 \quad (33)$$

The optimum $(\tilde{\lambda}^*, \tilde{\mu}^*, \tilde{\alpha}^*)$ can be given by the SDP (19) defining $\mathbf{x} \triangleq [\tilde{\alpha}_1, \Lambda, \tilde{\alpha}_M, \tilde{\lambda}_1, \Lambda, \tilde{\lambda}_N, \tilde{\mu}_1, \Lambda, \tilde{\mu}_M]^T \in \mathbb{P}^{(2M+N)\times 1}$. Hence the dual problem (27) is equivalent to:

$$\max_{\tilde{\lambda},\tilde{\mu},\tilde{\alpha}} \sum_{m=1}^{M} \tilde{\alpha}_m \sigma^2 - P_r\left(\sum_{i=1}^{N} \tilde{\lambda}_i\right) \quad (34)$$

subject to (32), (33), $m=1,\ldots,M$ (28).

Solve the optimum $\{\tilde{w}_m\}_{m=1}^{M}$ in (11) according to the value of $\{\alpha_m\}_{m=1}^{M}$ It can be shown that (32) is equivalent to $$\frac{\tilde{\alpha}_m P_0}{\gamma_m} f_m^H \tilde{K}_m^\dagger f_m \leq 1$$

for $m=1, \Lambda, M$, where $A^\dagger$ denotes the pseudo-inverse of $A$. Problem (34) can be rewritten as:

$$\max_{\tilde{\lambda},\tilde{\mu}} \max_{\tilde{\alpha}} \sum_{m=1}^{M} \tilde{\alpha}_m \sigma^2 - P_r\left(\sum_{i=1}^{N} \tilde{\lambda}_i\right) \quad (35)$$

subject to $\frac{\tilde{\alpha}_m P_0}{\gamma_m} f_m^H \tilde{K}_m^\dagger f_m \leq 1, m=1,\ldots,M$ (36)

(33), (28).

Let consider the following problem $$\max_{\tilde{\lambda},\tilde{\mu}} \min_{\tilde{\alpha}} \sum_{m=1}^{M} \tilde{\alpha}_m \sigma^2 - P_r\left(\sum_{i=1}^{N} \tilde{\lambda}_i\right) \quad (37)$$

subject to $\frac{\tilde{\alpha}_m P_0}{\gamma_m} f_m^H \tilde{K}_m^\dagger f_m \geq 1, m=1,\ldots,M$ (38)

(33), (28).

For a given $\{\tilde{\lambda},\tilde{\mu}\}$, it is not difficult to see that $$\frac{\tilde{\alpha}_m P_0}{\gamma_m} f_m^H \tilde{K}_m^\dagger f_m$$

is a monotonically increasing function of $\tilde{\alpha}_m > 0$. As a result, both (36) and (38) are met with equality at optimality. Note that (37) is obtained by substituting $$\tilde{w}_m = \frac{P_0}{\gamma_m} \tilde{k}_m^\dagger f_m$$

into:

$$\max_{\tilde{\lambda},\tilde{\mu}} \min_{w_m,\tilde{\alpha}} \sum_{m=1}^{M} \tilde{\alpha}_m \sigma^2 - P_r\left(\sum_{i=1}^{N} \tilde{\lambda}_i\right) \quad (39)$$

-continued $$\text{subject to } \frac{\tilde{\alpha}_m P_0 |w_m^H f_m|^2}{\left\|\hat{K}_m^{\frac{1}{2}} w_m\right\|^2} \geq \gamma_m, m = 1, \ldots, M \quad (40)$$

(33), (28).

Hence, the dual problem (27) is equivalent to (39). Using Lagrangian theory, results in:

$$\tilde{\theta}^* = \sum_{m=1}^{M} \tilde{\alpha}_m^* \sigma^2 - P_r\left(\sum_{i=1}^{N} \tilde{\lambda}_i^*\right) = \sigma^2 \sum_{m=1}^{M} \frac{\gamma_m}{P_0 f_m^H \tilde{K}_m^{*\dagger} f_m} - P_r\left(\sum_{i=1}^{N} \tilde{\lambda}_i^*\right). \quad (41)$$

Using the structure of the solution of (39), the optimum beamforming vectors $\tilde{w}^*_m$ of (11) up to a scale factor is given by:

$$\tilde{w}^*_m = \tilde{\zeta}_m \tilde{K}^{*\dagger}_m f_m, \quad (42)$$

where:

$$\tilde{\zeta}_m \triangleq \sigma \left[ \frac{P_0}{\gamma_m} |f_m^H \tilde{K}_m^{*\dagger} f_m|^2 - f_m^H \tilde{K}_m^{*\dagger} G_m \tilde{K}_m^{*\dagger} f_m \right]^{-\frac{1}{2}}. \quad (43)$$

Substituting $\tilde{w}_m = \tilde{\zeta}_m K^{*\dagger}_m f_m$ into (13), the solution $w_m$ is feasible if:

$$\sum_{m=1}^{M} \tilde{\zeta}_m^2 f_m^H \tilde{K}_m^{*\dagger} R_m D_i \tilde{K}_m^{*\dagger} f_m \leq P_r, \quad (44)$$

for i=1, Λ, N.

The original non-convex problem (11) with 2M+N constraints and MN+1 variables is converted to a convex problem with M+2 constraints and 2M+N variables. In the following, the set of optimum dual variables (34) is partitioned into three cases and the algorithm is proposed to obtain the optimum beamforming vectors (if exist) for each case.

1) Case 1

If $\tilde{\mu}_m=0$ for m=1, Λ, M and i=1, Λ, N, i.e., the constraint (12) is inactive for ∀m, there is no solution for the original problem (11). In other words, there should be at least one active constraint (12). This case happens due to infeasibility of (11), i.e., either minimum SNR guarantees (14) cannot be achieved or per relay power exceeds the given threshold in (13). In the following, it is assumed that ∃m such that $\tilde{\mu}_m>0$.

2) Case 2

If ∀m∈{1, Λ, M}, $\tilde{\mu}_m>0$ or ∃i such that $\tilde{\lambda}_i>0$, then $\tilde{\alpha}_m>0$ for m=1, Λ, M in (34). In other words, if $\tilde{K}_m - \tilde{\alpha}_m G_m \succ 0$ then $\tilde{\alpha}_m>0$ ∀m, the $$\frac{\tilde{\alpha}_m P_0}{\gamma_m} f_m^H \tilde{K}_m^{\dagger} f_m$$

in (36) becomes a monotonically increasing function of $\tilde{\alpha}_m$. Hence, the two problems (36) and (37) are equivalent and the proposed algorithm can be used to obtain $\tilde{w}_m$ by (42) for m=1, Λ, M.

In order to have positive real-valued $\tilde{\zeta}_m$ and satisfy (15), the following sufficient conditions for feasibility should be met $$\min_{1 \leq m \leq M} \frac{P_0}{\gamma_m} |f_m^H \tilde{K}_m^{*\dagger} f_m|^2 - f_m^H \tilde{K}_m^{*\dagger} G_m \tilde{K}_m^{*\dagger} f_m > 0, \quad (45)$$

$$\max_{1 \leq i \leq N} \sum_{m=1}^{M} \tilde{\zeta}_m^2 f_m^H \tilde{K}_m^{*\dagger} R_m D_i \tilde{K}_m^{*\dagger} f_m \leq P_r. \quad (46)$$

If either (45) or (46) is not satisfied, the optimization problem is not feasible.

3) Case 3

If ∃m such that $\tilde{\mu}_m>0$ and $\tilde{\lambda}_i=0$ for i=1, Λ, N, (42) cannot be used for m=1, Λ, M since $\tilde{\alpha}_m=0$ for some m. Let $\tilde{m}$ denote the pair with $\tilde{\mu}_{\tilde{m}}>0$. For simplicity, suppose $\tilde{\mu}_m=0$ for m≠$\tilde{m}$ and $\tilde{\Delta}_i=0$ for i=1, . . . , N. Then $\tilde{\alpha}_{\tilde{m}}>0$ and $\tilde{\alpha}_m=0$ for m∈{1, . . . , M}\{$\tilde{m}$}. It is verified by simulations that $$\frac{\tilde{\alpha}_{\tilde{m}}^* P_0}{\gamma_{\tilde{m}}} f_{\tilde{m}}^H \tilde{K}_{\tilde{m}}^{*\dagger} f_{\tilde{m}} = 1.$$

Hence, the solution (42) can be used to obtain the beamforming vector of Assuming the original problem (11) is feasible, then $\tilde{\theta}^* = \tilde{\alpha}_{\tilde{m}} \sigma^2$. In order to obtain the beamforming vectors for m≠$\tilde{m}$, a solution is needed to the following feasibility problem:

$$\text{find } \tilde{w}_1, \ldots, \tilde{w}_{\tilde{m}-1}, \tilde{w}_{\tilde{m}+1}, \ldots, \tilde{w}_M \quad (47)$$

$$\text{subject to } \tilde{w}_m^H \tilde{B}_m \tilde{w}_m < \theta^*, m \in \{1, \ldots, M\}\setminus\{\tilde{m}\},$$

$$\sum_{m=1}^{M} \tilde{w}_m^H R_m D_i \tilde{w}_m < P_r, i = 1, \ldots, N, \quad (48)$$

$$\frac{P_0 \tilde{w}_m^H F_m \tilde{w}_m}{\tilde{w}_m^H G_m \tilde{w}_m + \sigma^2} > \gamma_m, m \in \{1, \ldots, M\}\setminus\{\tilde{m}\}. \quad (49)$$

Note that $w_m$ can always be scaled such that (49) is met with equality for m≠$\tilde{m}$. Furthermore, it is known (48) is not active since $\lambda_i=0$ for i=1, Λ, N. Among infinite possible solutions of $\tilde{w}_m$ for m≠$\tilde{m}$, the following algorithm is proposed. As a result, the maximum interference power removing the effect of $\tilde{m}$ is found.

If $\tilde{w}_{\tilde{m}}^H R_{\tilde{m}} D_i \tilde{w}_{\tilde{m}} \overset{\Delta}{=} e_i$ for i=1, Λ, N, then a solution can be found for the following problem:

$$\min_{\tilde{w}_1, \ldots, \tilde{w}_M, \delta} \delta \quad (50)$$

$$\text{subject to } \tilde{w}_m^H \hat{B}_m \tilde{w}_m \leq \delta, m \in \{1, \ldots, M\}\setminus\{\tilde{m}\}, \quad (51)$$

$$\sum_{m=1, m \neq \tilde{m}}^{M} \tilde{w}_m^H R_m D_i \tilde{w}_m \leq P_r - e_i, i = 1, \ldots, N, \quad (52)$$

$$\frac{P_0 \tilde{w}_m^H F_m \tilde{w}_m}{\tilde{w}_m^H G_m \tilde{w}_m + \sigma^2} \geq \gamma_m, m \in \{1, \ldots, M\}\setminus\{\tilde{m}\}. \quad (53)$$

Let δ* denote the optimum value of (50), and $\tilde{\alpha}_{\tilde{m}}>0$ is supposed. If δ*<θ*, then $\tilde{w}_{\tilde{m}}$ can be found. If δ*≥θ*, then (11) is infeasible. In the following, the SDP to obtain the optimum dual variables of (50) is summarized. In a situation such as:

$$\hat{a} \overset{\Delta}{=} [\hat{a}_1^T, P_r-e_1, \ldots, P_r-e_N, \hat{a}_2^T]_T,$$  (54)

$$\hat{b} \overset{\Delta}{=} [0_{(M+N)\times 1}^T, \hat{b}_1^T]^T,$$  (55)

where $\hat{a}_1 \in P^{M \times 1}$, $\hat{a}_2 \in P^{M \times 1}$, and $\hat{b}_1 \in P^{M \times 1}$ are obtained by substituting $a(\tilde{m})=1$, $a(M+N+\tilde{m})=1$ (or any arbitrary positive value), and $b(M+N+\tilde{m})=0$, respectively. The dual problem is equivalent to:

$$\min_x \bar{a}^T x$$  (56)

$$\text{subject to } \sum_{i=1}^{2M+N} x_i \Psi_{m,i} \preceq 0, m = 1, \ldots, M.$$

$$x \geq 0, \tilde{b}^T x \leq 1,$$

where $\overline{\Psi}_{\tilde{m},i}=0$ and $\overline{\Psi}_{m,i}=\tilde{\Psi}_{m,i}$ for $m \in \{1, \Lambda, M\} \setminus \{\tilde{m}\}$ and $i=1, \Lambda, 2M+N$. By the definition of $\bar{a}$ in the the objective (56), any positive $\tilde{a}_{\tilde{m}}$ or $\mu_{\tilde{m},i}$ would be penalized, which would result in $\tilde{a}_{\tilde{m}}=0$ or $\mu_{\tilde{m}}=0$. Hence the effect of $\tilde{m}$-th pair in (56) is removed.

The above described a method and system to reduce (e.g. optimize, and in some cases, minimize) the maximum per sub-channel interference for a defined SNR (ie subject to a certain QoS). In another example, the proposed method can be described as follows:

---

Beamforming weights determination for use at a relay node $RN_1,...RN_N$ that reduces (e.g. minimizes) the maximum per sub-channel interference for a given SNR
Input: $P_0$, $F_m$, $G_m$, $\tilde{B}_m$, $\sigma^2$, $\gamma_m$, m = 1,...,M ;
Output: A beamforming vector $\tilde{w}_m$;
    Check the necessary condition in (18) for the feasibility of (11)
    evaluating the SNR upper-bound;
    Solve the SDP problem (19) finding the dual variables $\tilde{\alpha}, \tilde{\mu}, \tilde{\lambda}$ ;
    Obtain $\tilde{Y} \overset{\Delta}{=} \{m | \alpha_m > 0\}$
    If $\tilde{Y} == \{1,...,M\}$
    Compute $\tilde{K}_m \overset{\Delta}{=} R_m D_{\tilde{\lambda}} + \tilde{\mu}_m B_m + \tilde{\alpha}_m G_m$ (31);
    Compute the coefficient $\tilde{\zeta}_m$ and Find $\tilde{w}_m = \tilde{\zeta}_m \tilde{K}_m f_m$ (42), m = 1,..., M;
    else
    Find $\tilde{w}_m$ (42) for all $m \in \tilde{Y}$ ;
    Update $\bar{a}$ (54), $\bar{b}$ (55), and $\overline{\Psi}_{m,i}$, m = 1,...,M , i = 1,...,N ;
    Solve the SDP (56) finding the dual variables for $m \in \{1,...,M\} \setminus \tilde{Y}$ ;
    Compute the coefficient $\tilde{\zeta}_m$ and Find $\tilde{w}_m = \tilde{\zeta}_m \tilde{K}_m f_m$ (42), $m \in \{1, ...,M\} \setminus \tilde{Y}$ .
    end

---

Figure 3:
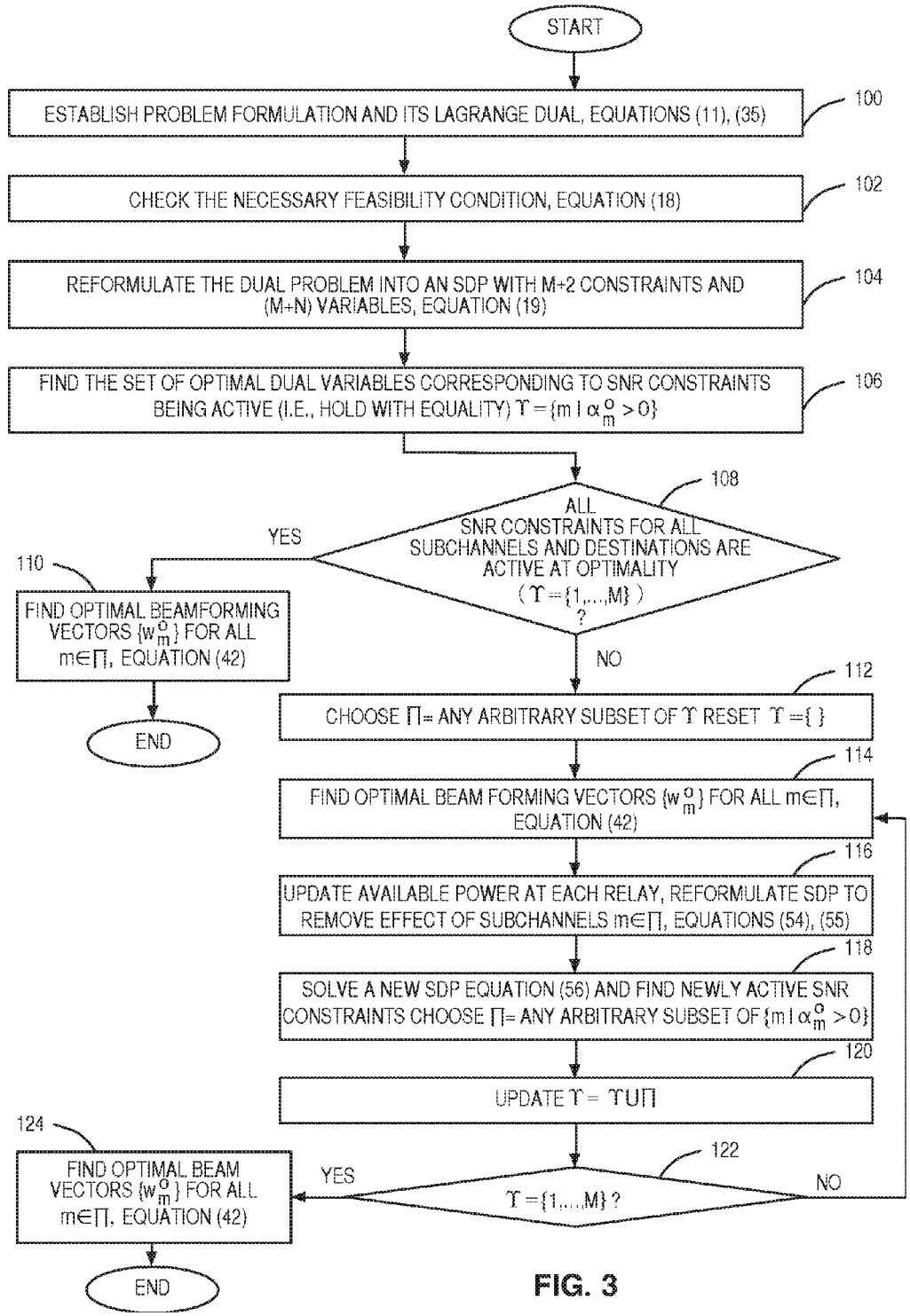
FIG. 3 illustrates a flowchart for the minimization of a maximum per subchannel interference, according to some embodiments of the current disclosure.

FIG. 3 illustrates a flowchart for the minimization of a maximum per subchannel interference, according to some embodiments of the current disclosure. This flowchart discusses the actions taken as if being performed by a single node such as a network node 38. However, these steps may be performed by different nodes working together or without coordination in some embodiments. Furthermore, some of these values may be precomputed and stored in various locations if they are not expected to change. While discussed as a network node 38 performing these steps, this may be a relay node, a base station, a wireless device, or some beamforming determining node which calculates values or coordinates these calculations.

As shown in FIG. 3, the network node 38 first establishes the problem formulation and its Lagrange dual problem. This may be accomplished according to equations 11 and/or 35 discussed above (step 100). Next, in some embodiments, the necessary feasibility condition is checked as in equation 18 (step 102). Then, if the problem is feasible, the dual problem is reformulated into an SDP problem with M+2 constraints and 2M+N variables as in equation 19 (step 104). Then, the set of optimal dual variables is found which corresponds to the SNR constraints which are active (that is, the constraints that hold with equality) (step 106). This can be noted as the set $\tilde{\gamma}$ which includes the indexes of the SNR constraints that are active.

Next, it is determined if all of the SNR constraints for all of the subchannels and destinations are active at optimality (step 108). If they are all active, then the beamforming weights can be determined a first way, e.g., formulaically, perhaps using equation 42 as described above (step 110). If this is possible, the process ends because the optimal values are already determined. However, in most realistic situations, this is not the case. If the SNR constraints are not all active, then the beamforming weights can be determined a second way, e.g., by using an iterative algorithm. Starting the iterative approach involves taking a new set of the subchannel indices $\Pi$ which is any arbitrary proper subset of $\tilde{\gamma}$. Then the set $\tilde{\gamma}$ is reset to be the empty set (step 112). As the iterative algorithm progresses, the subchannel weights that are optimally determined are included into the set $\tilde{\gamma}$ until that set contains all of the subchannel indices, indicating that all of the beamforming weights have been optimally determined.

The optimal beamforming weights for the subchannels in the set $\Pi$ are determined, perhaps using equation 42 as discussed above (step 114). Then the available power at each relay is updated, and the SDP is reformulated to remove the effects of the subchannels in $\Pi$ which have already been solved optimally. This may use equations 54 and 55 as discussed above (step 116). The new SDP is then solved, perhaps using equation 56, and the newly active SNR constraints are determined. $\Pi$ is again set to be an arbitrary subset of the subchannel indices that correspond to active constraints (step 118). Then, the set of optimally determined subchannel indices $\tilde{\gamma}$ is updated to include the subchannel indices that are in $\Pi$ (step 120). As discussed above, if $\tilde{\gamma}$ now contains all of the subchannel indices (step 122), then the iterative method can end, and the remaining beamforming weights can be determined formulaically, perhaps using equation 42 (step 124). If the set $\tilde{\gamma}$ does not yet contain all of the subchannel indices, the flowchart returns to step 114 and performs another iteration of the process. In some embodiments, this process is continued until all of the optimal beamforming weights have been determined.

The problem of reducing or minimizing the maximum per-relay power usage has been first studied by D. H. N. Nguyen and H. H. Nguyen, in "Power allocation in wireless multiuser multi-relay networks with distributed beamforming" IET Commun. Vol 5, pp. 2040-2051, September 2011, the disclosure of which is hereby incorporated by reference in its entirety. However, the solution proposed does not address the scenario where all of the (optimal) Lagrange dual variables corresponding to SNR constraints are not all positive (it has been observed in many simulations that some dual variables can be zero). To at least address this deficiency, and improve performance of wireless networks with relay nodes, the following is a method and system to reduce (e.g. optimize, and in some cases, minimize) the maximum per relay power usage for a defined SNR (ie subject to a certain QoS), according to another aspect of the present disclosure.

Let $\hat{P}_r$ denote maximum power usage of the relay nodes $RN_1, \ldots RN_N$. Then the problem of reducing (e.g. minimizing) the maximum per relay power usage for a given SNR, in terms of received SNR, is given by $$\min_{w_i,\ldots,w_M,\hat{P}_v} \hat{P}_r \quad (15)$$

$$\text{subject to} \sum_{m=1}^{M} w_m^H R_m D_i w_m \leq \hat{P}_r, \, i=1,\ldots,N, \quad (16)$$

To solve the following SDP problem and finding the dual variables $\hat{\alpha},\hat{\lambda}$, the following SDP problem is then solved. The optimum $(\hat{\lambda},\hat{\alpha})$ is obtained using SDP $$\min_{y} \bar{a}^T y \quad (57)$$

$$\text{subject to } \tilde{b}^T y \leq 1,$$

$$\sum_{i=1}^{M+N} y_i \Psi_{m,i} \leq 0, \, m=1,\ldots,M.$$

$$y \geq 0,$$

where $$\hat{a} \triangleq [-\sigma^2 1_{M\times 1}^T, -1_{N\times 1}^T]^T, \, \hat{b} \triangleq [0_{M\times 1}^T, 1_{N\times 1}^T]^T,$$

$$\hat{\Psi}_{m,m} = \frac{P_0}{\gamma_m} f_m f_m^H - G_m, \, \hat{\Psi}_{m,M+j} = -R_m D_j$$

for $m=1,\Lambda,M, j=1,\Lambda,N$ and all other $\hat{\Psi}$ are zeros. The dual problem associated with (15) is as follows:

$$\max_{\hat{\lambda},\hat{\alpha}} \min_{w_m,\hat{P}_v} L_3(\{w_m\}, \hat{P}_r, \hat{\lambda}, \hat{\alpha}) \quad (58)$$

$$\text{subject to } \hat{\lambda} \geq 0, \, \hat{\alpha} \geq 0, \quad (59)$$

Where:

$$L_3 = \sum_{m=1}^{M} \hat{\alpha}_m \sigma^2 + \hat{P}_r \left(1 - \sum_{i=1}^{N} \hat{\lambda}_i \right) + \quad (60)$$

$$\sum_{m=1}^{M} w_m^H \left( R_m(D_{\hat{\lambda}}) + \hat{\alpha}_m G_m - \frac{\hat{\alpha}_m P_0}{\gamma_m} f_m f_m^H \right) w_m,$$

and $D_{\hat{\lambda}} \triangleq \text{diag}(\hat{\lambda}_1, \Lambda, \hat{\lambda}_N)$. The dual problem (58) is equivalent to:

$$\max_{\hat{\lambda},\hat{\alpha}} \sum_{m=1}^{M} \hat{\alpha}_m \sigma^2 \quad (61)$$

$$\text{subject to } \hat{K}_m \geq \frac{\hat{\alpha}_m P_0}{\gamma_m} f_m f_m^H, \, m=1,\ldots,M \quad (62)$$

$$\sum_{i=1}^{N} \hat{\lambda}_i \leq 1, \quad (63)$$

(59),

Where:

$$\hat{K}_m \triangleq R_m(D_{\hat{\lambda}}) + \hat{\alpha}_m G_m. \quad (64)$$

Denoting $y \triangleq [\hat{\alpha}_1, \Lambda, \hat{\alpha}_M, \hat{\lambda}_1, \Lambda, \hat{\lambda}_N]$, the optimum $(\hat{\lambda},\hat{\alpha})$ is obtained using SDP, i.e., (57).

Solve the optimum in (15) according to the value of $\{\hat{\alpha}_m\}_{m=1}^{M}$ To solve the optimum $\hat{P}_r, \{\hat{w}_m\}_{m=1}^{M}$ in (15) according to the value of $\{\hat{\alpha}_m\}_{m=1}^{M}$, using the structure of the solution of (57), the determined (optimum) beamforming vectors $w_m$ of (15) up to a scale factor is given by:

$$\hat{w}_m = \hat{\zeta}_m \hat{K}_m^\dagger f_m, \quad (65)$$

where:

$$\hat{\zeta}_m \triangleq \sigma \left[ \frac{P_0}{\gamma_m} | f_m^H \hat{K}_m^\dagger f_m |^2 - f_m^H \hat{K}_m^\dagger G_m \hat{K}_m^\dagger f_m \right]^{-\frac{1}{2}}. \quad (66)$$

In some simulations, it is observed that $\exists m$ with $\hat{\alpha}_m=0$ in (57), while the problem (15) is feasible. In those cases, we have $\hat{\lambda}_i=0$ for some i. The constraint (62) is not active for all m such that $\hat{\alpha}_m=0$, i.e., if $\exists\{m, i\}$ such that $\hat{\alpha}_m=0$ and $\hat{\lambda}_i=0$, (65) cannot be used for m. Let $\tilde{m}$ denote the pair with $\hat{\alpha}_{\tilde{m}}>0$ and $\hat{\lambda}_{\tilde{i}}$ denote the relay with $\hat{\lambda}_{\tilde{i}}=1$. In other words, suppose $\hat{\alpha}_m=0$ for $m\neq\tilde{m}$ and $\hat{\lambda}_i=0$ for $i\neq\tilde{i}$. It is verified by simulations that $$\frac{\hat{\alpha}_{\tilde{m}}^* P_0}{\gamma_{\tilde{m}}} f_{\tilde{m}}^H \tilde{K}_{\tilde{m}}^{*\dagger} f_{\tilde{m}} = 1.$$

Hence, the solution (65) can be used to obtain the beamforming vector of $\tilde{m}$. Then assuming the problem (15) is feasible, then $\hat{P}^*_r = \hat{\alpha}_{\tilde{m}} \sigma^2$. In order to obtain the beamforming vectors for $m\neq\tilde{m}$, the following feasibility problem needs to be solved:

$$\text{find } w_1,\ldots,w_{\tilde{m}-1}, w_{\tilde{m}+1},\ldots,w_M \quad (67)$$

$$\text{subject to } \max_i \sum_{m=1,m\neq\tilde{m}}^{M} w_m^H R_m D_i w_m + e_i = \hat{P}^*_r, \quad (68)$$

(49).

Note that $\hat{w}_m$ can always be scaled such that (49) is met with equality for $m\neq\tilde{m}$. Substituting $\hat{\alpha}_m=0$ into (16) results in $$\sum_{m=1,m\neq\tilde{m}}^{M} \hat{w}_m^H R_m D_i \hat{w}_m = 0.$$

Since the constraint (60) is met with equality for $\tilde{i}$, then $\hat{w}_{\tilde{m}}^H R_{\tilde{m}} D_{\tilde{i}} \hat{w}_{\tilde{m}} = e_{\tilde{i}} = \hat{P}^*_r$. Among infinite possible solutions of $\hat{w}_m$ for $m \neq \hat{m}$, the following algorithm is proposed. Intuitively, the maximum per relay power usage is found removing the effect of $\hat{m}$.

$$\min_{w_1,\ldots,w_{\hat{m}-1},w_{\hat{m}+1},\ldots,w_M,\hat{\delta}} \hat{\delta} \qquad (69)$$

$$\sum_{m=1,m\neq\hat{m}}^{M} w_m^H R_m D_{\hat{i}} w_m \leq 0 \qquad (70)$$

$$\sum_{m=1,m\neq\hat{m}}^{M} w_m^H R_m D_i w_m \leq \hat{\delta}, \, i \neq \hat{i}, \qquad (71)$$

(53).

Let $\hat{\delta}^*$ denote the optimum value of (69) and suppose (71) is active for $\check{i}$. If $\hat{\delta}^* + e_{\check{i}} \leq \hat{P}^*_r$, then we can find $w_m$ for $m \neq \hat{m}$. The dual problem of (69) can be solved by substituting:

$$\hat{a}(\hat{m})=0, \qquad (72)$$

$$\hat{b}(M+\check{i})=0, \qquad (73)$$

$$\Psi_{\hat{m},\hat{m}}=0 \qquad (74)$$

into SDP (57).

The above described a method and system to reduce (e.g. optimize, and in some cases, minimize) the maximum per relay power usage for a defined SNR (ie subject to a certain QoS). In another example, the proposed method can be described as follows:

---

Beamforming weights determination for use at a relay node $RN_1,\ldots RN_N$ that reduces (e.g. minimizes) the maximum per relay node power.
Input: $P_0$, $F_m$, $G_m$, $R_m$, $\sigma^2$, $\gamma_m$, m = 1,...,M ;
Output: A beamforming vector $\hat{w}_m$;
    Check the necessary condition for feasibility of (15) evaluating the SNR upper-bound;
    Solve the SDP problem (57) finding the dual variables $\hat{\alpha}$, $\hat{\mu}$, $\hat{\lambda}$ ;
    Obtain $\hat{Y} \triangleq \{m | \hat{\alpha}_m > 0\}$
    If $\hat{Y} == \{1,\ldots,M\}$
    Compute $\hat{K}_m \triangleq R_m D_{\hat{\lambda}} + \hat{\alpha}_m G_m$ (64);
    Compute the coefficient $\hat{\zeta}_m$ as in (66) and find $\hat{w}_m = \hat{\zeta}_m \hat{K}_m f_m$ (65), m = 1,...,M;
    else
    Find $\hat{w}_m$ for all $m \in \hat{Y}$ ;
    Update $\hat{a}$ (72), $\hat{b}$ (73), and $\hat{\Psi}_{m,i}$ (74), m = 1,...,M , i = 1,...,N ;
    Solve the SDP (57) finding the dual variables for $m \in \{1,\ldots,M\} \setminus \hat{Y}$ ;
    Compute the coefficient $\hat{\zeta}_m$ as in (66) and find $\hat{w}_m = \hat{\zeta}_m \hat{K}_m f_m$ (65), $m \in \{1,\ldots,M\} \setminus \hat{Y}$ .
    end

---

Figure 4:
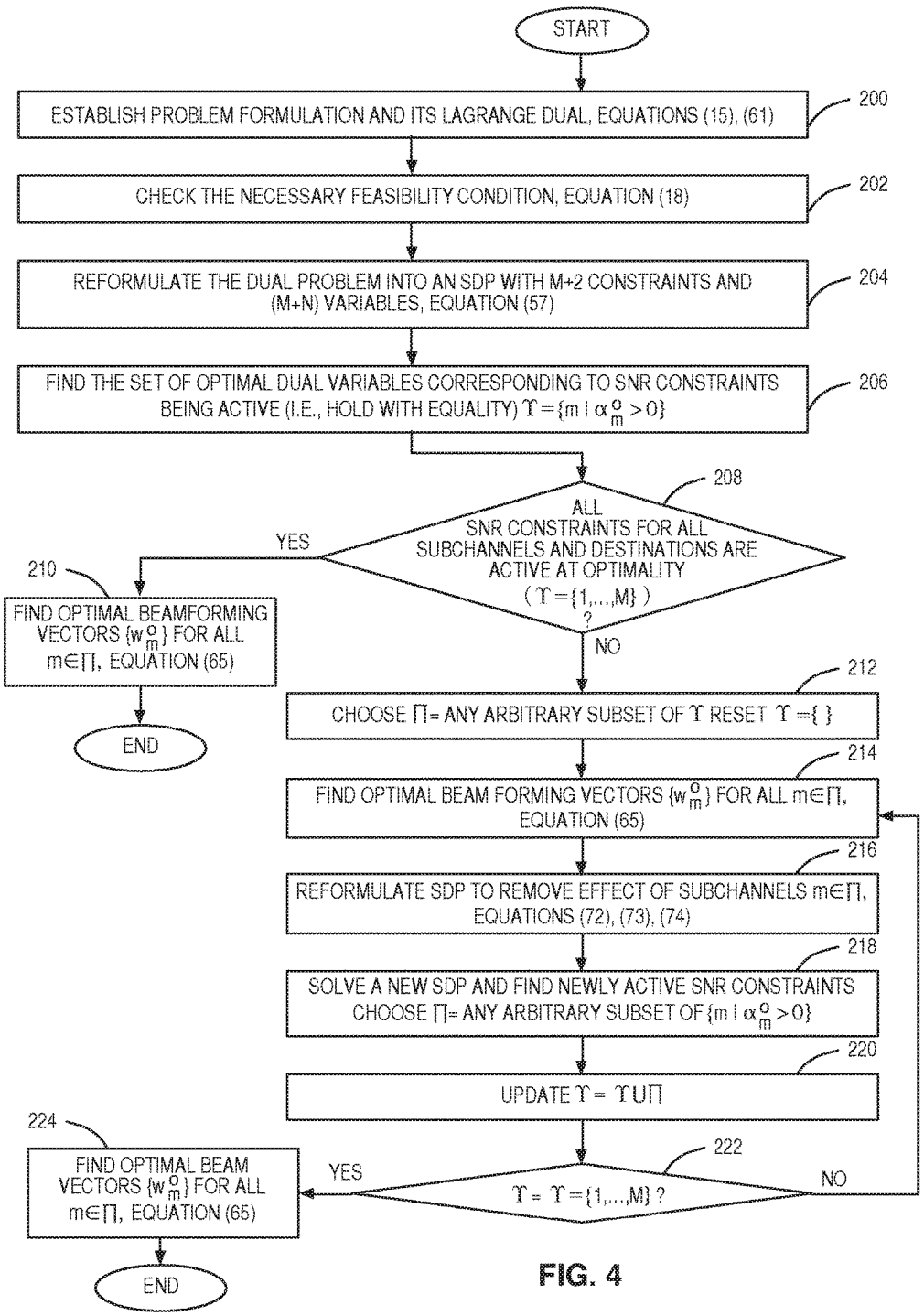
FIG. 4 illustrates a flowchart for the minimization of a maximum per relay power usage, according to some embodiments of the current disclosure.

FIG. 4 illustrates a flowchart for the minimization of a maximum per relay power usage, according to some embodiments of the current disclosure.

This flowchart discusses the actions taken as if being performed by a single node such as a network node 38. However, these steps may be performed by different nodes working together or without coordination in some embodiments. Furthermore, some of these values may be precomputed and stored in various locations if they are not expected to change. While discussed as a network node 38 performing these steps, this may be a relay node, a base station, a wireless device, or some beamforming determining node which calculates values or coordinates these calculations.

As shown in FIG. 4, the network node 38 first establishes the problem formulation and its Lagrange dual problem. This may be accomplished according to equations 15 and/or 61 discussed above (step 200). Next, in some embodiments, the necessary feasibility condition is checked as in equation 18 (step 202). Then, if the problem is feasible, the dual problem is reformulated into an SDP problem with M+2 constraints and M+N variables as in equation 57 (step 204). Then, the set of optimal dual variables is found which correspond to the SNR constraints which are active (that is, the constraints that hold with equality) (step 206). This can be noted as the set $\bar{\gamma}$ which includes the indexes of the SNR constraints that are active.

Next, it is determined if all of the SNR constraints for all of the subchannels and destinations are active at optimality (step 208). If they are all active, then the beamforming weights can be determined a first way, e.g., formulaically, perhaps using equation 65 as described above (step 210). If this is possible, the flowchart ends because the optimal values are already determined. However, in most realistic situations, this is not the case. If the SNR constraints are not all active, then the beamforming weights can be determined a second way, e.g., by using an iterative algorithm to solve for the optimal beamforming weights. Starting the iterative approach involves taking a new set of the subchannel indices $\Pi$, which is any arbitrary proper subset of $\bar{\gamma}$. Then the set $\bar{\gamma}$ is reset to be the empty set (step 212). As the iterative algorithm progresses, the subchannel weights that are optimally determined are included into the set $\bar{\gamma}$ until that set contains all of the subchannel indices, indicating that all of the beamforming weights have been optimally determined.

The optimal beamforming weights for the subchannels in the set $\Pi$ are determined, perhaps using equation 65 as discussed above (step 214). Then the SDP is reformulated to remove the effects of the subchannels in $\Pi$ which have already been solved optimally. This may use equations 72, 73, and/or 74 as discussed above (step 216). The new SDP is then solved, and the newly active SNR constraints are determined. $\Pi$ is again set to be an arbitrary subset of the subchannel indices that correspond to active constraints (step 218). Then, the set of optimally determined subchannel indices $\bar{\gamma}$ is updated to include the subchannel indices that are in $\Pi$ (step 220). As discussed above, if $\bar{\gamma}$ now contains all of the subchannel indices (step 222), then the iterative method can end, and the remaining beamforming weights can be determined formulaically, perhaps using equation 65 (step 224). If the set $\bar{\gamma}$ does not yet contain all of the subchannel indices, the flowchart returns to step 214 and performs another iteration of the process. In some embodiments, this process is continued until all of the optimal beamforming weights have been determined.

Figure 5:
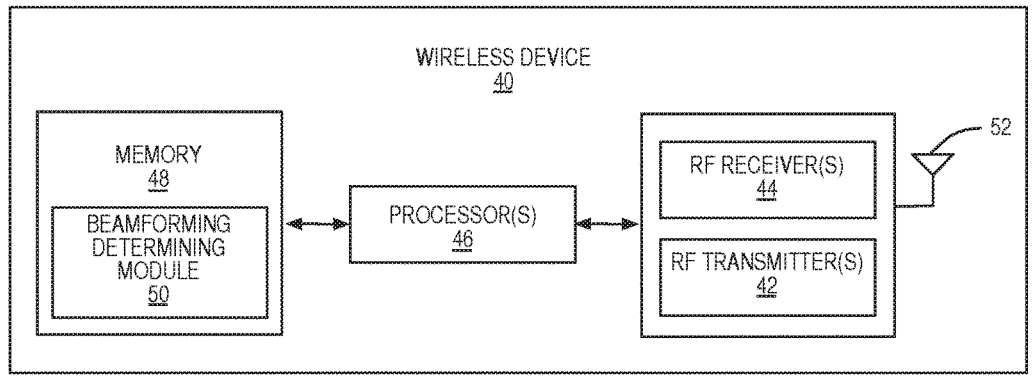
FIG. 5 illustrates one example of the wireless devices of FIGS. 1 and 2, according to some embodiments of the current disclosure.

Each destination node $RX_1, \ldots RX_m$ of cell 30 in FIGS. 1 and 2 is a wireless device or a UE. An example is shown in FIG. 5 as wireless device 40. The wireless device 40 includes one or more RF transmitters 42, and one or more RF receivers 44 for communication with network node 26 which, in one embodiment may be replaced by one or more transceivers. The wireless device 40 also includes one or more processors 46 which may be one or more central processing units (CPUs) for performing the beamforming determination process described herein. Each wireless device 40 includes a memory 48 (e.g. non-volatile and volatile memory, such as hard drive, flash memory, memory stick and the like. Also, volatile memory may include random access memory and others known in the art. If the wireless device 40 is configured to act as a relay node, the wireless device memory 48 may store program instructions such as those to perform the beamforming functionality described herein. For example, a beamforming determining module 50 includes instructions, which when executed by the processor 46, cause the wireless device 40 processor 46 to perform beamforming functions described herein.

Figure 6:
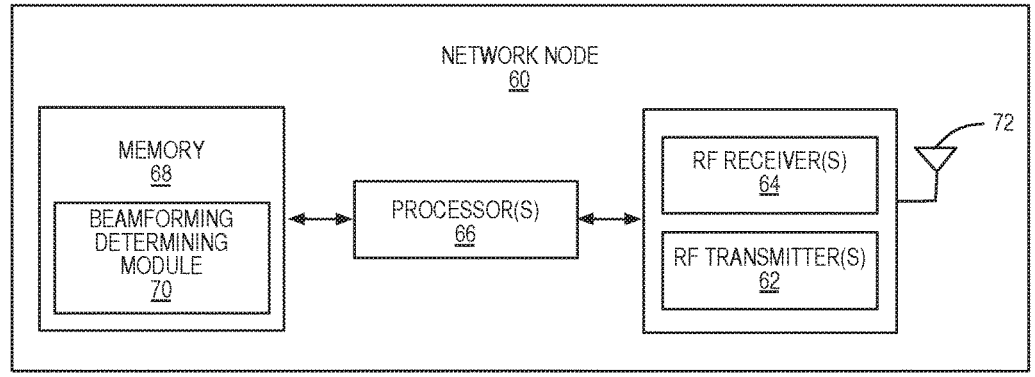
FIG. 6 illustrates one example of the network nodes of FIGS. 1 and 2, according to some embodiments of the current disclosure.

An example of relay nodes $RN_1, \ldots RN_N$ in FIGS. 1 and 2 is shown in FIG. 6 as network node 60. In that example, the network node 60 includes one or more RF transmitters 62 and one or more RF receivers 64 for communication with the destination nodes $RX_1, \ldots RX_m$, network node 26 and other nodes, devices and servers. In one embodiment, the RF transmitter 62 and RF receiver 64 may be replaced with one or more transceivers. The network node 60 includes one or more processors 66 which may be one or more central processing units (CPUs) for performing the beamforming determination functions described herein. The network node 60 also includes a memory 68 that stores the beamforming determination functions, among other modules and data. In particular, the memory 68 may include non-volatile and volatile memory. For example, non-volatile memory may include a hard drive, flash memory, memory stick and the like. Also, volatile memory may include random access memory and others known in the art. The network node memory 68 may store program instructions such as those for a beamforming determining module 70. For example, the beamforming determining module 70 includes instructions, which when executed by the network node processor 66, cause the processor to perform the beamforming determination process, described herein.

Figure 7:
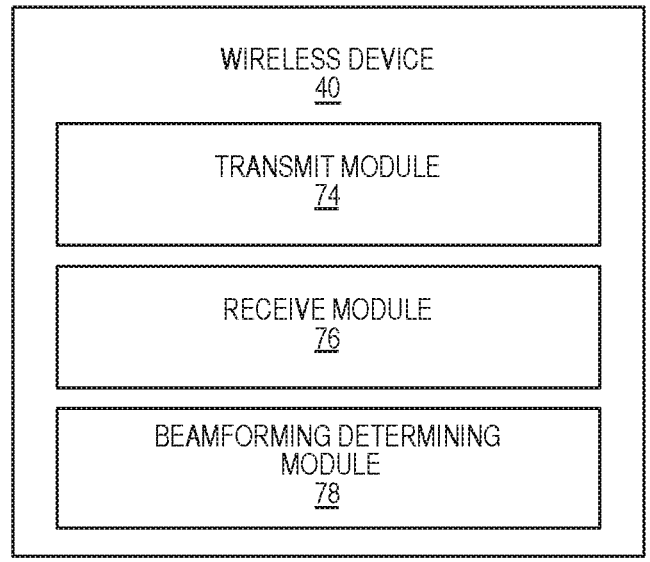
FIG. 7 illustrates another example of the wireless devices of FIGS. 1 and 2, according to some embodiments of the current disclosure.

FIG. 7 illustrates another example of the wireless device 40 of FIGS. 1 and 2 including a transmit module 74, a receive module 76, and a beamforming determining module 78, according to some embodiments of the current disclosure. The transmit module 74, the receive module 76, and the beamforming determining module 78 are each implemented in software that, when executed by a processor of wireless device 40, causes the wireless device 40 to operate according to one of the embodiments described herein. The transmit module 74 and the receive module 76 operate to transmit and receive information from other nodes, as described above. The beamforming determining module 78 operates to determine beamforming weights or any intermediate values that may be processed by other nodes such as a network node 60 which could be a relay node or a beamforming determining node.

Figure 8:
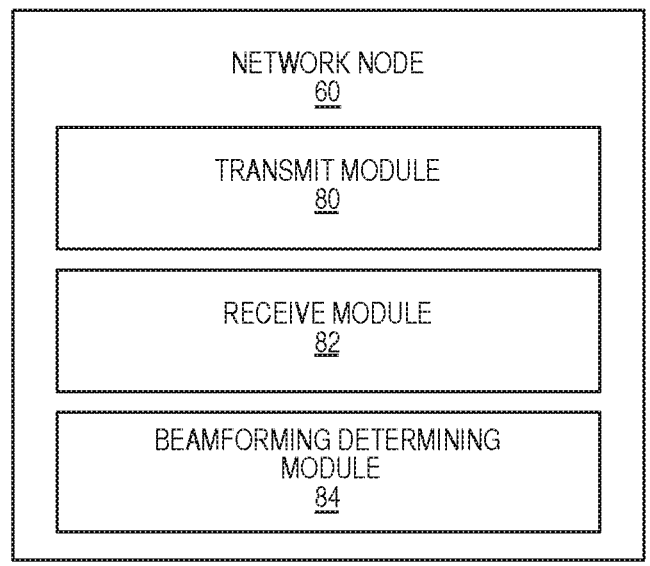
FIG. 8 illustrates another example of the network nodes of FIGS. 1 and 2, according to some embodiments of the current disclosure.

FIG. 8 illustrates another example of the network nodes 60 of FIGS. 1 and 2 including a transmit module 80, a receive module 82, and a beamforming determining module 84, according to some embodiments of the current disclosure. The transmit module 80, the receive module 82, and the beamforming determining module 84 are each implemented in software that, when executed by a processor of network node 60, causes the network node 60 to operate according to one of the embodiments described herein. The transmit module 80 and the receive module 82 operate to transmit and receive information from other nodes, as described above. The beamforming determining module 84 operates to determine beamforming weights or any intermediate values that may be processed by other nodes such as a wireless device 40 or a relay node or a beamforming determining node.

In some embodiments, a computer program including instructions which, when executed by at least one processor, causes the at least one processor to carry out the functionality of determining the beamforming weights according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

The following acronyms are used throughout this disclosure.

| | |
|---|---|
| 3GPP | 3rd Generation Partnership Project |
| AP | Access Point |
| BTS | Base Transceiver Station |
| CMAS | Commercial Mobile Alert System |
| CN | Core Network |
| CSI | Channel State Information |
| D2D | Device-to-device |
| DAS | Distributed Antenna System |
| EDGE | Enhanced Data rates for GSM Evolution |
| eNB | eNodeB |
| E-UTRAN | Evolution UMTS Terrestrial Radio Access Network |
| FDD | Frequency-Division Duplexing |
| GERAN | GSM Enhanced Data rates for GSM Evolution (EDGE) Radio Access Network |
| GPS | Global Positioning System |
| GSM | Global System for Mobile Communication |
| LEE | Laptop Embedded Equipped |
| LME | Laptop Mounted Equipment |
| LTE | Long Term Evolution |
| M2M | Machine-to-Machine |
| MME | Mobility Management Entity |
| MTC | Machine Type Communication |
| PDA | Personal Digital Assistant |
| PLMN | Public Land Mobile Network (PLMN) |
| PRB | Physical Resource Block |
| PWS | Public Warning System |
| QoS | Quality of Service |
| RB | Resource Block |
| RRH | Remote Radio Head |
| RRU | Remote Radio Unit |
| SC | Single Carrier |
| SDP | Semidefinite Programming |
| SOCP | Second Order Cone Programming |
| TDD | Time-Division Duplexing |
| USB | Universal Serial Bus |
| UE | User Equipment |
| UTRA | Universal Mobile Telecommunications System Terrestrial Radio Access Network |
| WCDMA | Wide band code division multiple access |

Those skilled in the art will recognize improvements and modifications to the preferred embodiments of the present disclosure. All such improvements and modifications are considered within the scope of the concepts disclosed herein and the claims that follow.

What is claimed is:

1. A method of operation of a network node in a cellular communications system comprising:
  determining beamforming weights for a plurality of subchannels for each of a plurality of relay nodes such that a parameter is minimized for a defined channel quality, the parameter being one of the group consisting of a maximum per subchannel interference and a maximum per relay power usage, wherein determining the beamforming weights comprises:
   determining a dual problem of the minimization of the parameter where a solution maximizing the dual problem will minimize the parameter;
   reformulating the dual problem into a semidefinite programming (SDP) problem;
   determining if a plurality of signal-to-noise ratio (SNR) constraints are all active;
   if the plurality of SNR constraints are all active, solving the SDP problem and determining the beamforming weights for each of the plurality of relay nodes a first way such that the parameter is minimized; and
   if the plurality of SNR constraints are not all active, solving the SDP problem and determining the beamforming weights for each of the plurality of relay nodes a second way such that the parameter is minimized.

2. The method of claim 1 further comprising communicating the determined beamforming weights to each of the plurality of relay nodes.

3. The method of claim 1 wherein solving the SDP problem the second way comprises solving a sequence of SDP problems and determining the beamforming weights for each of the plurality of relay nodes using an iterative method such that the parameter is minimized.

4. The method of claim 3 wherein solving the sequence of SDP problems using the iterative method comprises:
choosing a proper subset of the plurality of subchannels;
determining beamforming weights for the proper subset of the plurality of subchannels such that the parameter is minimized;
reformulating the SDP problem to remove effects of the proper subset of the plurality of subchannels;
if solving the reformulated SDP problem is sufficient to obtain the beamforming weights for the plurality of subchannels other than the proper subset of the plurality of subchannels, solving the reformulated SDP problem to obtain the beamforming weights for the plurality of subchannels other than the proper subset of the plurality of subchannels; and
if solving the reformulated SDP problem is insufficient to obtain the beamforming weights for the plurality of subchannels other than the proper subset of the plurality of subchannels:
choosing a second proper subset of the plurality of subchannels from the plurality of subchannels other than the first proper subset;
determining beamforming weights for the second proper subset of the plurality of subchannels such that the parameter is minimized;
reformulating the SDP problem to remove effects of the second proper subset of the plurality of subchannels; and
if solving the reformulated SDP problem is sufficient to obtain the beamforming weights for the plurality of subchannels other than the second proper subset of the plurality of subchannels, solving the reformulated SDP problem to obtain the beamforming weights for the plurality of subchannels other than the second proper subset of the plurality of subchannels.

5. The method of claim 4 further comprising repeating the steps of choosing, determining, reformulating, and solving if the reformulated SDP problem cannot be solved to obtain the beamforming weights for the plurality of subchannels other than the proper subset of the plurality of subchannels, until the beamforming weights for all of the plurality of subchannels are determined.

6. The method of claim 1 wherein solving the SDP problem the first way comprises solving the SDP problem and determining the optimal beamforming weights formulaically.

7. The method of claim 1 further comprising, prior to reformulating the dual problem into the SDP problem, checking a necessary feasibility condition.

8. The method of claim 1 wherein the network node is a base station in communication with each of the plurality of relay nodes.

9. The method of claim 1 wherein the parameter is the maximum per subchannel interference subject to a channel quality constraint.

10. The method of claim 1 wherein the parameter is the maximum per relay power usage subject to a channel quality constraint.

11. A network node in a cellular communications network, comprising:
a processing module; and
a memory module storing instructions executable by the processing module whereby the network node is operable to:
determine beamforming weights for a plurality of subchannels for each of a plurality of relay nodes such that a parameter is minimized subject to a channel quality constraint, the parameter being one of the group consisting of a maximum per subchannel interference and a maximum per relay power usage, wherein, in order to determine the beamforming weights, the network node is operable to:
determine a dual problem of the minimization of the parameter where a solution maximizing the dual problem will minimize the parameter;
reformulate the dual problem into a semidefinite programming (SDP) problem;
determine if a plurality of signal-to-noise ratio (SNR) constraints are all active;
if the plurality of SNR constraints are all active, solve the SDP problem and determine the beamforming weights for each of the plurality of relay nodes a first way such that the parameter is minimized; and
if the plurality of SNR constraints are not all active, solve the SDP problem and determine the beamforming weights for each of the plurality of relay nodes a second way such that the parameter is minimized.

12. The network node of claim 11 further operable to communicate the determined beamforming weights to each of the plurality of relay nodes.

13. The network node of claim 11 wherein being operable to solve the SDP problem the second way comprises being operable to solve a sequence of SDP problems and determining the beamforming weights for each of the plurality of relay nodes using an iterative method such that the parameter is minimized.

14. The network node of claim 13 wherein being operative to solve the sequence of SDP problems using the iterative method comprises being operable to:
choose a proper subset of the plurality of subchannels;
determine beamforming weights for the proper subset of the plurality of subchannels such that the parameter is minimized;
reformulate the SDP problem to remove effects of the proper subset of the plurality of subchannels;
if solving the reformulated SDP problem is sufficient to obtain the beamforming weights for the plurality of subchannels other than the proper subset of the plurality of subchannels, solve the reformulated SDP problem to obtain the beamforming weights for the plurality of subchannels other than the proper subset of the plurality of subchannels; and
if solving the reformulated SDP problem is insufficient to obtain the beamforming weights for the plurality of subchannels other than the proper subset of the plurality of subchannels:
choose a second proper subset of the plurality of subchannels from the plurality of subchannels other than the first proper subset;

determine beamforming weights for the second proper subset of the plurality of subchannels such that the parameter is minimized;

reformulate the SDP problem to remove effects of the second proper subset of the plurality of subchannels; and if solving the reformulated SDP problem is sufficient to obtain the beamforming weights for the plurality of subchannels other than the second proper subset of the plurality of subchannels, solve the reformulated SDP problem to obtain the beamforming weights for the plurality of subchannels other than the second proper subset of the plurality of subchannels.

15. The network node of claim 14 further operable to repeat the steps of choosing, determining, reformulating, and solving if the reformulated SDP problem cannot be solved to obtain the beamforming weights for the plurality of subchannels other than the proper subset of the plurality of subchannels, until the beamforming weights for all of the plurality of subchannels are determined.

16. The network node of claim 11 wherein being operable to solve the SDP problem the first way comprises being operable to solve the SDP problem and determine the optimal beamforming weights formulaically.

17. The network node of claim 11 further operable to, prior to reformulating the dual problem into the SDP problem, check a necessary feasibility condition.

18. The network node of claim 11 wherein the network node is a base station in communication with each of the plurality of relay nodes.

19. The network node of claim 11 wherein the parameter is the maximum per subchannel interference.

20. The network node of claim 11 wherein the parameter is the maximum per relay power usage.

* * * * *